(12) United States Patent
Stehr et al.

(10) Patent No.: US 11,560,946 B2
(45) Date of Patent: Jan. 24, 2023

(54) FLUID SYSTEM FOR A CONTINUOUSLY VARIABLE TRANSMISSION

(71) Applicant: Schaeffler Technologies AG & Co. KG, Herzogenaurach (DE)

(72) Inventors: Reinhard Stehr, Bühl (DE); Sebastian Köpfler, Bühl (DE); Markus Ciesek, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/258,676

(22) PCT Filed: Jul. 5, 2019

(86) PCT No.: PCT/DE2019/100632
§ 371 (c)(1),
(2) Date: Jan. 7, 2021

(87) PCT Pub. No.: WO2020/020405
PCT Pub. Date: Jan. 30, 2020

(65) Prior Publication Data
US 2021/0270364 A1 Sep. 2, 2021

(30) Foreign Application Priority Data
Jul. 23, 2018 (DE) .......................... 102018117737.2

(51) Int. Cl.
*F16H 61/662* (2006.01)
*F15B 11/17* (2006.01)
(Continued)

(52) U.S. Cl.
CPC ......... *F16H 61/66272* (2013.01); *F15B 1/26* (2013.01); *F15B 11/17* (2013.01);
(Continued)

(58) Field of Classification Search
CPC ............ F15B 11/17; F15B 2211/20576; F04B 23/04; F04B 23/06; F16H 61/0031;
(Continued)

(56) References Cited

U.S. PATENT DOCUMENTS

| | | | | |
|---|---|---|---|---|
| 4,942,786 A | * | 7/1990 | Dittrich | ............. F16H 61/66272 |
| | | | | 477/44 |
| 6,219,608 B1 | | 4/2001 | Abo et al. | |
| 8,584,452 B2 | * | 11/2013 | Lloyd | ................... F16H 61/448 |
| | | | | 60/494 |
| 10,274,082 B2 | * | 4/2019 | Van Der Sluis | .. F16H 61/66272 |

(Continued)

FOREIGN PATENT DOCUMENTS

| | | |
|---|---|---|
| CN | 107787421 A | 3/2018 |
| DE | 10037114 A1 | 7/2001 |
| DE | 102006034090 A1 | 1/2008 |
| DE | 102012208323 A1 | 12/2012 |
| DE | 102014222396 A1 | 5/2016 |
| DE | 102016207134 B3 | 9/2017 |

(Continued)

*Primary Examiner* — Michael Leslie

(57) ABSTRACT

A fluid system for a continuously variable transmission includes a first pump, a first actuation unit, a first line section, a second actuation unit, and a second line section. The first pump has a first sub-pump and a second sub-pump. The first actuation unit is assigned to a first disc set of the continuously variable transmission and the second actuation unit is assigned to a second disc set of the continuously variable transmission. The first line section fluidically connects the first pump to the first actuation unit and the second line section fluidically connects the first pump to the second actuation unit. The second sub-pump has a first connection that can be selectively fluidically connected to the first actuation unit via the first line section, or the second sub-pump has a second connection that can be selectively fluidically connected to the second actuation unit via the second line section.

13 Claims, 2 Drawing Sheets

(51) Int. Cl.
  *F15B 1/26*      (2006.01)
  *F16H 61/00*     (2006.01)
  *F16H 61/30*     (2006.01)
  *F16H 61/448*    (2010.01)
  *F16H 9/16*      (2006.01)

(52) U.S. Cl.
  CPC ......... *F16H 61/0031* (2013.01); *F16H 61/30* (2013.01); *F16H 61/448* (2013.01); *F16H 9/16* (2013.01)

(58) Field of Classification Search
  CPC .......... F16H 61/30; F16H 61/448; F16H 9/16; F16H 61/66272
  See application file for complete search history.

(56) References Cited

U.S. PATENT DOCUMENTS

| 10,364,887 B2* | 7/2019 | Van Rooij ............... F16H 61/30 |
| 2018/0080551 A1 | 3/2018 | Van Rooij et al. |

FOREIGN PATENT DOCUMENTS

| DE | 102016214932 A1 | 2/2018 |
| DE | 102018105040 A1 | 1/2019 |
| EP | 0764799 A1 | 3/1997 |
| JP | 2001330113 A | 11/2001 |
| JP | 2006250297 A | 9/2006 |
| WO | 03087627 A1 | 10/2003 |
| WO | 2014032757 A1 | 3/2014 |
| WO | 2017033888 A1 | 3/2017 |
| WO | 2019161835 A1 | 8/2019 |

* cited by examiner

FLUID SYSTEM FOR A CONTINUOUSLY VARIABLE TRANSMISSION

CROSS-REFERENCE TO RELATED APPLICATIONS

This application is the United States National Phase of PCT Appln. No. PCT/DE2019/100632 filed Jul. 5, 2019, which claims priority to German Application No. DE102018117737.2 filed Jul. 23, 2018, the entire disclosures of which are incorporated by reference herein.

TECHNICAL FIELD

The disclosure relates to a fluid system for a continuously variable transmission, with a first pump. A first connection of the first pump is fluidically connected via a first line section to a first actuation unit assigned to a first disc set of the transmission, and a second connection of the first pump is fluidically connected via a second line section to a second actuation unit assigned to a second disc set of the transmission.

BACKGROUND

Generic fluid systems and continuously variable belt transmissions are already known from the prior art. For example, U.S. Pat. No. 6,219,608 B1 discloses an electronic transmission control system for a motor vehicle with a continuously variable transmission. This includes a first and a second fluid pump driven by an electric motor for pressing and adjusting a variator of the belt transmission.

However, relatively large stroke volumes of the pump may be required to cover large volume flows, for example in the case of quick adjustment. These large stroke volumes require a high torque and correspondingly high power consumption from an actuator motor that drives the pump, since the pressure must be maintained during normal driving. Power loss is thus high, even if no hydraulic power has to be provided, since there is no volume flow requirement during constant driving apart from leakage compensation.

SUMMARY

The disclosure provides a fluid system with a pump which can simultaneously provide a large stroke volume when peak power is required and can be switched to a reduced stroke volume during normal operation.

According to the disclosure, the first pump is formed by at least one first sub-pump and a second sub-pump. A first connection of the second sub-pump can be switchably fluidically connected to the first actuation unit and/or a second connection of the second sub-pump can be switchably fluidically connected to the second actuation unit. This means that the second sub-pump can be switchably connected to the first actuation unit and/or the second actuation unit and/or a reservoir. The power of the first pump is thus divided into two smaller sub-pumps, wherein one or both sub-pumps can be switched to active for conveying fluid.

The first pump can thus be adapted such that the first sub-pump is permanently connected to the first and the second actuation unit and the second sub-pump can be switched on if necessary. For example, the two sub-pumps may be dimensioned relatively small. It is therefore possible, in order to access peak power, to activate both sub-pumps, i.e., to connect them to the first and second actuation units, and to activate only the first sub-pump and to connect the second sub-pump to a reservoir, for example, for normal driving.

A second pump may be connected to the second line section. As a result, the second pump can be used to provide a basic fluid pressure so that the first pump only has to apply a differential pressure to adjust the continuously variable transmission. The first pump can thus be dimensioned with a relatively small stroke volume. In addition, a pressure of the second pump can thus be used to drive the second sub-pump as a motor, so that a motor driving the first pump is supported.

If the second pump is also connected to a cooling and/or lubricant circuit of the belt transmission, cooling or lubrication of the belt transmission is provided in a simple manner.

The second pump may be designed as a pump with a fixed, i.e., non-adjustable, conveying direction with an input connection of the second pump (fluidically) connected to a reservoir, and an output connection of the second pump (fluidically) connected to the second line section.

The sub-pumps may each be formed by a wheel set which is arranged on a common drive shaft or by a pressure kidney, each arranged on a common wheel set. As a result, the sub-pumps can be driven by a common motor and the second sub-pump can be used as a hydraulic motor that supports the motor. A design by means of a pressure kidney in each case has proven to be a cost-effective and compact solution.

The first connection of the second sub-pump may be fluidically connected to the first actuation unit or to a reservoir depending on a switching position of a first valve assembly. The second connection of the first sub-pump may be fluidically connected to the second actuation unit. Thus, the second sub-pump can be actively switched in a switching position of the first valve assembly for fluid delivery, i.e., connected to the first actuation unit, and, in another switching position of the first valve assembly, decoupled from the fluid-conveying fluid system, i.e., connected to the reservoir. Due to the arrangement on a drive shaft, the second sub-pump runs idle in the other switching position of the first valve assembly or can be used as a hydraulic motor to drive the motor.

Furthermore, the second connection of the second sub-pump may be fluidically connected to the second actuation unit or to the reservoir, depending on a switching position of a second valve assembly. The first connection of the second sub-pump may be fluidically connected to the first actuation unit. Thus, the second sub-pump can be actively switched in a switching position of the second valve assembly for fluid delivery, i.e., connected to the second actuation unit, and, in another switching position of the second valve assembly, decoupled from the fluid-conveying fluid system, i.e., connected to the reservoir.

The first valve assembly and/or the second valve assembly may be formed by two 2/2-way valves connected together. In this way, an inexpensive switching of the second sub-pump can be implemented. For example, the 2/2-way valves are designed so that in one switching position of the first and/or the second valve assembly, one of the two 2/2-way valves is in a blocking position and the other of the two 2/2-way valves is in an open position.

Alternatively, the first valve assembly and/or the second valve assembly may be formed by a 3/2-way valve. In this way, an inexpensive, easily controllable implementation of the circuit can be formed. For example, one connection may be connected to the reservoir, one connection may be connected to the first or second actuation unit, and one connection may be connected to the first or second connection of the second sub-pump.

The first valve assembly and/or the second valve assembly can be formed by a seat valve and/or by slide valves. This means that the 2/2-way valves can be designed as a seat valves or as slide valves. This also means that the 3/2-way valve can be designed as a seat valve or as slide valves.

The first pump can be driven in a first direction of rotation and in a second direction of rotation opposite to the first direction of rotation. The first pump, i.e., both sub-pumps, are thus designed as a reversing pump so that a volume flow can be conveyed in both directions.

The first pump and/or the second pump can be driven by an electric motor. Here, in contrast to rigid pumps with a mechanical pump driven by a transmission input, electrically driven pumps can provide hydraulic power exactly when it is needed.

The first pump may be formed by a hydraulic transformer. In this way, the first pump can be divided into sub-pumps in an infinitely variable manner, so that the power can be provided as required.

In other words, the disclosure relates to a continuously variable transmission with a pump actuator and two sub-pumps. According to the disclosure, the pump is divided into at least two smaller sub-pumps, and one or both sub-pumps can be switched to active for conveying fluid. The pump size can thus be adapted to the respective requirement, so that the motor currents and power losses can be reduced.

BRIEF DESCRIPTION OF THE DRAWINGS

The disclosure is explained below with the aid of drawings. In the figures.

DETAILED DESCRIPTION

The figures are only schematic in nature and serve only for understanding the disclosure. The same elements are provided with the same reference symbols. Features of the different exemplary embodiments can be interchanged.

Figure 1:
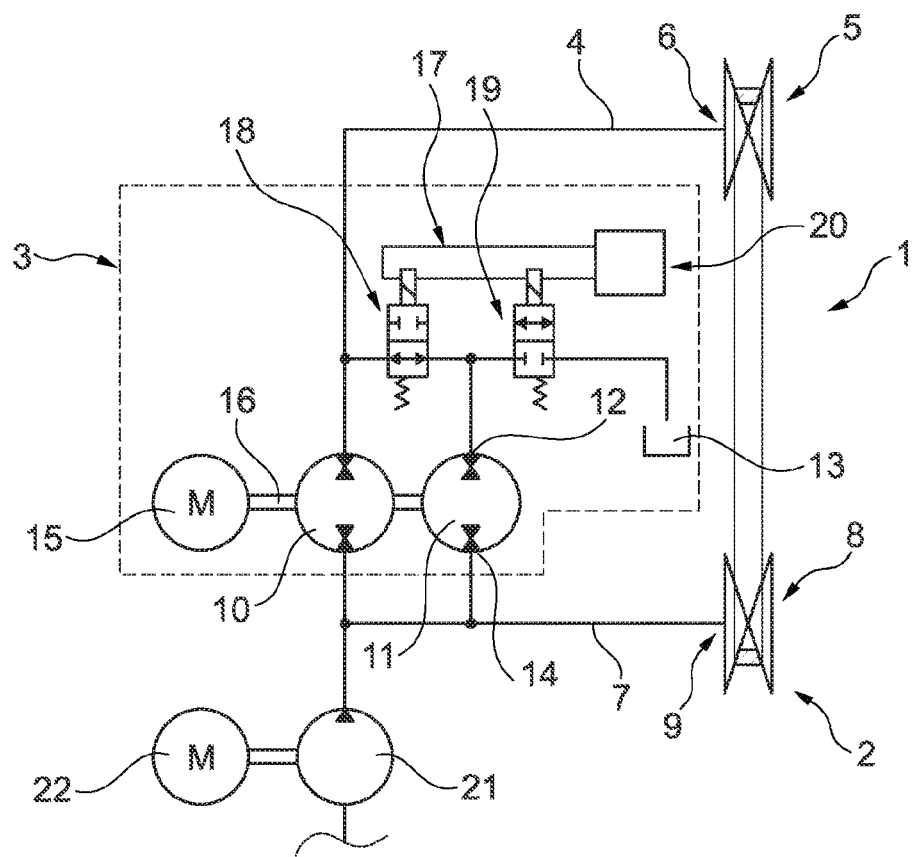
FIG. 1 shows a schematic representation of a fluid system according to the disclosure with a first pump formed by two sub-pumps in a first embodiment.

FIG. 1 shows a fluid system 1 for a continuously variable transmission 2 in a first embodiment. The fluid system 1 has a first pump 3. A first connection of the first pump 3 is fluidically connected via a first line section 4 to a first actuation unit 6 assigned to a first disc set 5 of the transmission 2. A second connection of the first pump 3 is fluidically connected via a second line section 7 to a second actuation unit 9 assigned to a second disc set 8 of the transmission 2.

The first pump 3 is formed by a first sub-pump 10 and a second sub-pump 11, the connections of which are each fluidically connected to the first line section 4 and to the second line section 7. A first connection 12 of the second sub-pump 11 can be switchably fluidically connected via the first line section 4 to the first actuation unit 6 or to a reservoir/tank 13. In the first embodiment, a second connection 14 of the second sub-pump 11 is directly, i.e., not switchably, fluidically connected to the second actuation unit 9 via the second line section 7.

The first sub-pump 10 and the second sub-pump 11 are driven by an electric motor 15. Both sub-pumps 10, 11 are arranged on a common drive shaft 16 which is driven in rotation by the electric motor 15. Thus, in the first embodiment, the first pump 3 is part of an electric pump actuator (EPA).

The first connection 12 of the second sub-pump 11 is switchably fluidically connected to the first line section 4 or the first actuation unit 6 or to the reservoir 13 via a first valve assembly 17. In the first embodiment, the first valve assembly 17 is controlled by a first 2/2-way valve 18, which is arranged between the first connection 12 of the second sub-pump 11 and the first actuation unit 6, and a second 2/2-way valve 19, which is arranged between the first connection 12 of the second sub-pump 11 and the reservoir 13 is formed. The first and the second 2/2-way valve 18, 19 are switched jointly by a controller 20. The controller 20 is not shown in the further embodiments for the sake of simplicity. The first and the second 2/2-way valve 18, 19 can be designed, for example, as seat valves or as slide valves.

In a rest position of the first valve assembly 17, the first 2/2-way valve 18 is in an open position, in which the first connection 12 of the second sub-pump 11 and the first actuation unit 6 are fluidically connected to one another, and the second 2/2-way valve 19 is in a blocking position in which the first connection 12 and the reservoir 13 are fluidically separated from one another. In an actuating position of the first valve assembly 17, the first 2/2-way valve 18 is in a blocking position in which the first connection 12 of the second sub-pump 11 and the first actuation unit 6 are fluidically separated from one another, and the second 2/2-way valve 19 is in a passage position in which the first connection 12 and the reservoir 13 are fluidically connected to one another.

In the rest position of the first valve assembly 17, the two sub-pumps 10, 11 work in parallel for a largest volume flow towards the first disc set 5 (or towards the second disc set 8). In the actuating position of the first valve assembly 17, only the first sub-pump 10 works for the volume flow to the first disc set 5 and the second sub-pump 11 acts as a hydraulic motor that supports the drive of the first sub-pump 10 when the pressure on the first disc set 5 is larger than on the second disc set 8.

A second pump 21 is fluidically connected to the second line section 7. The second pump 21 is driven by an electric motor 22 and is therefore part of a further electric pump actuator (EPA) that generates pressure on the second disc set 8.

Figure 2:
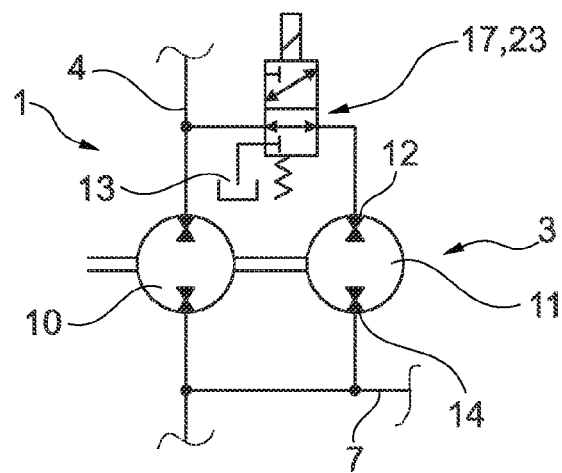
FIG. 2 shows a schematic representation of the fluid system with the first pump in a second embodiment.

In FIG. 2, a second embodiment of the fluid system 1 is shown. The second embodiment corresponds essentially to the first embodiment. It differs from the first embodiment in the first valve assembly 17. The first valve assembly 17 is formed by a 3/2-way valve 23 which fluidically connects the first connection 12 of the second sub-pump 11 to the first line section 4 or to the reservoir 13. In a rest position of the first valve assembly 17, the first connection 12 of the second sub-pump 11 and the first line section 4 are fluidically connected to one another and the first connection 12 and the reservoir 13 are fluidically separated from one another. In an actuating position of the first valve assembly 17, the first connection 12 of the second sub-pump 11 and the first line section 4 are fluidically separated from one another and the first connection 12 and the reservoir 13 are fluidically connected to one another. The 3/2-way valve 23 can be designed, for example, as a seat valve or as a slide valve.

Figure 3:
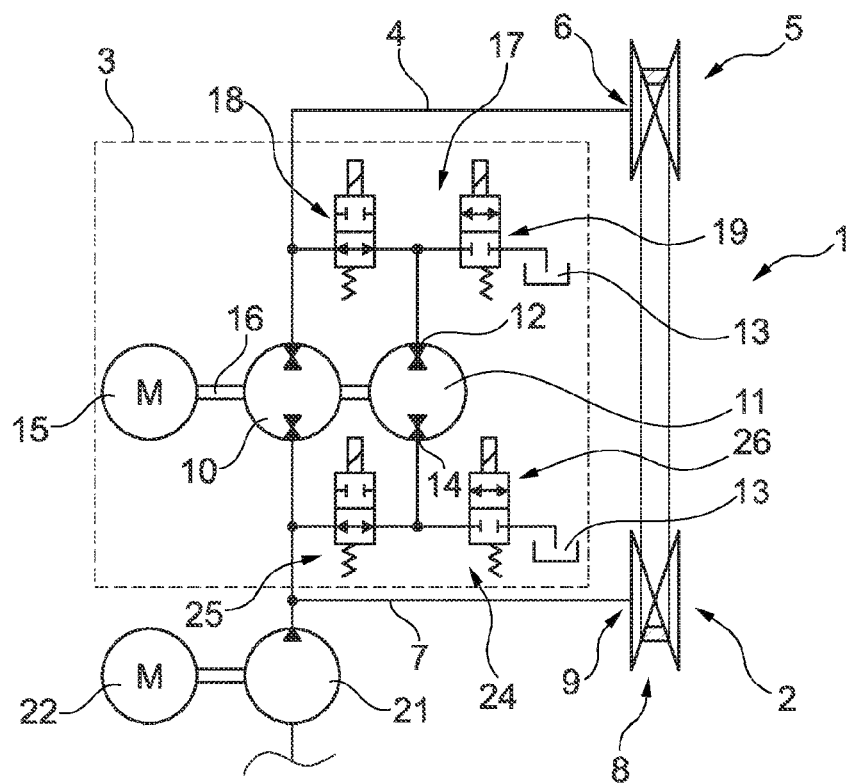
FIG. 3 shows a schematic representation of the fluid system with the first pump in a third embodiment.

FIG. 3 shows a third embodiment of the fluid system 1. The third embodiment corresponds essentially to the first embodiment. It only differs from the first embodiment in that the second connection 14 of the second sub-pump 11 is not directly connected to the second line section 7 or the second actuation unit 9, but that the second connection 14 is can be switchably fluidically connected via a second valve assembly 24 to the second actuation unit 9 or the reservoir 13.

In the third embodiment, the second valve assembly 24 is controlled by a third 2/2-way valve 25, which is arranged between the second connection 14 of the second sub-pump 11 and the second actuation unit 9, and a fourth 2/2-way valve 26, which is arranged between the second connection 14 of the second sub-pump 11 and the reservoir 13 is formed. The third and fourth 2/2-way valves 25, 26 are switched jointly by a controller. The third and fourth 2/2-way valves can also be controlled separately.

In a rest position of the second valve assembly 24, the third 2/2-way valve 25 is in an open position, in which the second connection 14 of the second sub-pump 11 and the second actuation unit 9 are fluidically connected to one another, and the fourth 2/2-way valve 26 is in a blocking position in which the second connection 14 and the reservoir 13 are fluidically separated from one another. In an actuating position of the second valve assembly 24, the third 2/2-way valve 25 is in a blocking position in which the second connection 14 of the second sub-pump 11 and the second actuation unit 9 are fluidically separated from one another, and the fourth 2/2-way valve 26 is in a passage position in which the second connection 14 and the reservoir 13 are fluidically connected to one another. The second valve assembly 24 can also be formed by a 3/2-way valve, analogously to the second embodiment, even if this is not shown.

According to the third embodiment, there are four switching positions: When all 2/2-way valves 18, 19, 25, 26 are in the rest position, the two sub-pumps 10, 11 work in parallel for the greatest volume flow to the first disc set 5 (or to the second disc set 8). The switching position is used to achieve maximum performance. When all 2/2-way valves 18, 19, 25, 26 are in the actuating position, i.e., switched, the first sub-pump 10 works solely for the volume flow and the second sub-pump 11 also runs moment-neutral. The switching position is used for energy-saving operation with low volume requirements. When the first and second 2/2-way valves 18, 19 are in the actuating position and the third and fourth 2/2-way valves 25, 26 are in the rest position, the second sub-pump 11 works as a hydraulic motor and supports the drive of the first sub-pump 10. The switching position is used for extended energy-saving operation during normal travel (pull), i.e., when the pressure on the first disc set 5 is greater than that of the second disc set 8. When the first and second 2/2-way valves 18, 19 are in the rest position and the third and fourth 2/2-way valves 25, 26 are in the actuating position and when the pressure on the second disc set 8 is greater than that on the first disc set 5 (push), the first sub-pump 10 works through the pressure gradient for the volume flow towards the first disc set 5 and experiences a braking backpressure gradient, which lowers a necessary drive torque for the first pump 3.

Figure 4:
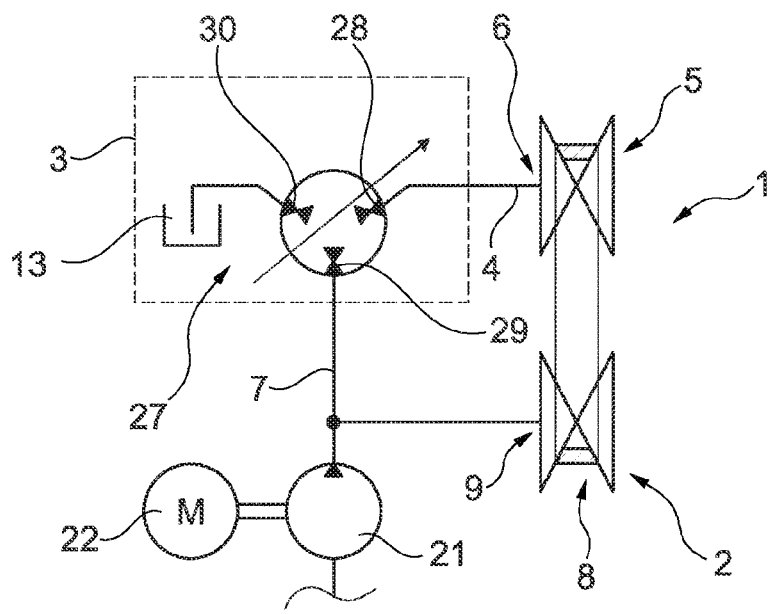
FIG. 4 shows a schematic representation of the fluid system with the first pump in a fourth embodiment.

FIG. 4 shows a fourth embodiment of the fluid system 1. In the fourth embodiment, the first pump 3 is formed by a hydraulic transformer 27. Internally, the hydraulic transformer 27 has two continuously variable sub-pumps. However, the internal structure is not discussed in detail at this point, but reference is made, for example, to the specification DE 10 2012 208 323 A1. The hydraulic transformer 27 draws its energy from the second pump 21, which is driven by the electric motor 22. The hydraulic transformer 27 has a first connection 28 which is fluidically connected via the first line section 4 to the first actuation unit 6, a second connection 29 which is fluidically connected via the second line section 7 to the second actuation unit 9 (and to the second pump 21), and a third connection 30 which is fluidically connected to the reservoir 13. As a result of its adjustment, the hydraulic transformer 27 can realize pressure differences and volume flows between the first and second disc set 5, 8 in both directions.

REFERENCE NUMERALS

1 Fluid system
2 Transmission
3 First pump
4 First line section
5 First disc set
6 First actuation unit
7 Second line section
8 Second disc set
9 Second actuation unit
10 First sub-pump
11 Second sub-pump
12 First connection
13 Reservoir
14 Second connection
15 Electric motor
16 Drive shaft
17 First valve assembly
18 First 2/2-way valve
19 Second 2/2-way valve
20 Controller
21 Second pump
22 Electric motor
23 3/2-way valve
24 Second valve assembly
25 Third 2/2-way valve
26 Fourth 2/2-way valve
27 Hydraulic transformer
28 First connection
29 Second connection
30 Third connection

The invention claimed is:

1. A fluid system for a continuously variable transmission, comprising:
   a first pump comprising a first sub-pump and a second sub-pump;
   a first actuation unit assigned to a first disc set of the continuously variable transmission;
   a first line section fluidically connecting the first pump to the first actuation unit;
   a second actuation unit assigned to a second disc set of the continuously variable transmission; and
   a second line section fluidically connecting the first pump to the second actuation unit; wherein:
   the second sub-pump comprises a first connection that can be selectively fluidically connected to the first actuation unit via a valve assembly and the first line section; or
   the second sub-pump comprises a second connection that can be selectively fluidically connected to the second actuation unit via the second line section; and
   when the second sub-pump is fluidically connected to a reservoir via the valve assembly, the second sub-pump can operate as a hydraulic motor configured to support a drive of the first sub-pump.

2. The fluid system of claim 1, further comprising an electric motor for driving the first pump.

3. The fluid system of claim 1, further comprising a second pump, wherein:
the second pump is connected to the second line section; or
the second pump can be connected to the second line section.

4. The fluid system of claim 3, further comprising an electric motor for driving the second pump.

5. The fluid system of claim 1, wherein:
the first sub-pump and the second sub-pump are formed by respective wheel sets arranged on a common drive shaft; or
the first sub-pump and the second sub-pump are formed by respective pressure-kidneys arranged on a common wheel set.

6. The fluid system of claim 1, further comprising:
a first valve assembly; and
a reservoir, wherein:
in a first switching position of the first valve assembly, the first connection of the second sub-pump is fluidically connected to the first actuation unit; and
in a second switching position of the first valve assembly, the first connection of the second sub-pump is fluidically connected to the reservoir.

7. The fluid system of claim 6, wherein the first valve assembly is formed by:
two 2/2-way valves connected together; or
a 3/2-way valve.

8. The fluid system of claim 1, further comprising:
a second valve assembly; and
a reservoir, wherein:
in a first switching position of the second valve assembly, the second connection of the second sub-pump is fluidically connected to the second actuation unit; and
in a second switching position of the second valve assembly, the second connection of the second sub-pump is fluidically connected to the reservoir.

9. The fluid system of claim 8, wherein the second valve assembly is formed by:
two 2/2-way valves connected together; or
a 3/2-way valve.

10. The fluid system of claim 1, wherein the first pump can be driven in a first direction of rotation and in a second direction of rotation, opposite to the first direction of rotation.

11. A fluid system for a continuously variable transmission, comprising:
a hydraulic transformer having;
a first connection fluidically connecting the hydraulic transformer to a first actuation unit assigned to a first disc set;
a second connection fluidically connecting the hydraulic transformer to a second actuation unit assigned to a second disc set; and
a third connection fluidically connecting the hydraulic transformer to a reservoir;
a first line section fluidically connecting the first connection to the first actuation unit; and
a second line section fluidically connecting the second connection to the second actuation unit.

12. The fluid system of claim 11, further comprising a pump fluidically connected to the hydraulic transformer and the second actuation unit via at least the second line section.

13. The fluid system of claim 12, further comprising an electric motor for driving the pump.

\* \* \* \* \*